United States Patent
Gloss et al.

(10) Patent No.: US 10,371,342 B2
(45) Date of Patent: Aug. 6, 2019

(54) LIGHT DEVICE, ESPECIALLY A SIGNAL LAMP, FOR MOTOR VEHICLES

(71) Applicant: Varroc Lighting Systems, s.r.o., Senov u Noveho Jicina (CZ)

(72) Inventors: Tomas Gloss, Vitkov (CZ); Vit Simurda, Novy Jicin (CZ); Ondrej Matuska, Opava (CZ)

(73) Assignee: VARROC LIGHTING SYSTEMS, S.R.O., Senov U Noveho (CZ)

( * ) Notice: Subject to any disclaimer, the term of this patent is extended or adjusted under 35 U.S.C. 154(b) by 10 days.

(21) Appl. No.: 15/821,334

(22) Filed: Nov. 22, 2017

(65) Prior Publication Data

US 2018/0149330 A1    May 31, 2018

(30) Foreign Application Priority Data

Nov. 28, 2016  (CZ) .................................. 2016-741

(51) Int. Cl.
*F21S 43/245*  (2018.01)
*F21S 43/30*  (2018.01)
(Continued)

(52) U.S. Cl.
CPC .......... *F21S 43/245* (2018.01); *B60Q 1/0058* (2013.01); *F21S 43/14* (2018.01); *F21S 43/237* (2018.01); *F21S 43/239* (2018.01); *F21S 43/251* (2018.01); *F21S 43/30* (2018.01); *F21S 43/31* (2018.01); *F21S 43/40* (2018.01);
(Continued)

(58) Field of Classification Search
None
See application file for complete search history.

(56) References Cited

U.S. PATENT DOCUMENTS

| 5,700,078 A | 12/1997 | Fohl et al. |
|---|---|---|
| 8,675,152 B2 | 3/2014 | Kim et al. |

(Continued)

FOREIGN PATENT DOCUMENTS

| CZ | 305740 B6 | 2/2016 |
|---|---|---|
| EP | 2450726 A1 | 5/2012 |

(Continued)

OTHER PUBLICATIONS

Search Report from Corresponding Czech Application PV 2016-741 dated Aug. 11, 2017 (1 page).

*Primary Examiner* — Kristy A Haupt
(74) *Attorney, Agent, or Firm* — Hovey Williams LLP (57) ABSTRACT

A light device, especially a signal lamp, for motor vehicles, comprising a carrier housing covered by a translucent cover, and an inner chamber in which at least one primary optical assembly is housed, and comprising a planar light guide to guide the light generated by a lighting unit. The light guide surface comprises a front output surface to emit light rays out of the light device and an input surface to bind light rays produced by the lighting unit. The light guide surface includes, on its side facing away from the front output surface, at least one reflective surface configured to direct light rays to, and through, the output surface out of the planar light guide to create, on the front output surface, an output light region with a light intensity which differs from light intensity shown by places adjacent to the region on the front output surface.

20 Claims, 8 Drawing Sheets

(51) Int. Cl.
  *F21S 43/239*    (2018.01)
  *F21V 8/00*    (2006.01)
  *B60Q 1/00*    (2006.01)
  *F21S 43/14*    (2018.01)
  *F21S 43/237*    (2018.01)
  *F21S 43/251*    (2018.01)
  *F21S 43/31*    (2018.01)
  *F21S 43/40*    (2018.01)

(52) U.S. Cl.
  CPC .......... *G02B 6/0028* (2013.01); *G02B 6/0041* (2013.01); *G02B 6/0043* (2013.01)

(56) References Cited

U.S. PATENT DOCUMENTS

| | | |
|---|---|---|
| 9,784,425 B2 | 10/2017 | Mateju et al. |
| 2010/0073954 A1* | 3/2010 | Gebauer .............. G02B 6/0036 362/551 |

FOREIGN PATENT DOCUMENTS

| | | |
|---|---|---|
| WO | 2010055984 A1 | 5/2010 |
| WO | 2014199108 A1 | 12/2014 |

* cited by examiner

Fig. 5

LIGHT DEVICE, ESPECIALLY A SIGNAL LAMP, FOR MOTOR VEHICLES

FIELD OF THE INVENTION

The invention relates to a light device, especially a signal lamp, for motor vehicles. Thus, the invention falls within the field of the design of signal lamps for motor vehicles, and relates to a light device adapted to produce spatial light effects or other designer elements.

BACKGROUND INFORMATION

A lamp for motor vehicles typically contains multiple lighting units, wherein each of these lighting units provides a different light function or contributes to ensuring the required emission characteristic of the light trace. Individual lighting units are generally mounted in a shaped carrier housing, while each lighting unit comprises at least one light source and other optical elements. The light source emits light rays and the optical elements represent a system of refractive and reflective surfaces and interfaces of optical environments that influence the direction of light rays within the creation of the output light trace.

The documents CZ305740B6, WO2014199108A1, KR2010055984A disclose devices for motor vehicles that actively produce patterns with a spatial light effect in the lit up condition. The signal lamp known from the document CZ305740B6 comprises at least one light source arranged at the input of a spatially shaped planar light guide fitted with volume diffusion material and output surfaces, while in the off condition a spatial impression is maintained. If a planar light guide that is made of volume diffusion material is used, light needs to be bound by means of an input surface or edge. To meet the designer requirements, this input surface must be covered when the inner space of the light device is viewed. For this purpose, a covering mask must be used, which covers some parts of the light device in the front view. A disadvantage of this device is the fact that the covering mask represents an extra part, which results in higher installation requirements. Also, the advantages of two-stage plastic injection molding cannot be used when clear transparent parts and covering opaque parts can be combined in an integral molding.

SUMMARY OF THE INVENTION

The object of the present invention is to provide a light device, especially a signal lamp, for motor vehicles that actively creates light regions with variable light intensity, e.g. patterns with a spatial effect, in the lit up condition, the optical assembly of the light device having low installation requirements, the output light functions being homogeneous and the light device being easy to manufacture with low costs.

The above-mentioned objects of the present invention are achieved through a light device, especially a signal lamp, for motor vehicles, according to the present invention, comprising a carrier housing covered by a translucent cover, and an inner chamber in which at least one primary optical assembly is housed comprising a planar light guide to guide the light generated by a lighting unit. The light guide surface comprises a front output surface to emit light rays out of the light device, and an input surface to bind light rays produced by the lighting unit positioned outside the light guide surface into the planar light guide. The light guide surface includes, on its side facing away from the front output surface, at least one reflective surface configured to direct light rays to the front output surface and further through the output surface out of the planar light guide to create, on the front output surface, an output light region with a light intensity which differs from light intensity shown by places adjacent to the region on the front output surface.

In one of the embodiments, the planar light guide comprises diffusion particles to diffuse light rays, included in at least one structure.

In another one of the embodiments, at least one of the structures is positioned in the body of the planar light guide.

In yet another of the embodiments, at least one of the structures is positioned on the surface of the planar light guide.

At least one of the structures can be transparent or at least partly transparent.

In one of the embodiments, the lighting unit comprises an assembly of light sources mounted on a carrier opposite the input surface of the planar light guide.

In another one of the embodiments, the lighting unit comprises a linear light guide fitted with an input surface and an output surface, at least one light source being situated at the input surface of the linear light guide, and the output surface of the linear light guide being situated opposite the input surface of the planar light guide.

In another embodiment, the lighting unit comprises a lighting planar light guide fitted with an input surface and an output surface, at least one light source being situated at the input surface of the lighting planar light guide, and the output surface of the lighting planar light guide being situated opposite the input surface of the planar light guide.

The planar light guide can be fitted with a non-transparent covering segment to cover at least a part of the lighting unit in the front view.

The planar light guide can also be produced as one integral piece, which can be by using the plastic injection molding process.

In one of the embodiments, in the view of the inner chamber, behind the planar light guide, an active optical element is arranged comprising a surface facing the rear surface of the planar light guide with diffusion and/or reflective properties to return rays that have escaped from the planar light guide through a part of its surface different from the front output surface, back to the planar light guide body.

In another embodiment, in a view of the inner chamber, behind the planar light guide, at least one reflector is arranged, which is a part of the secondary optical assembly, to reflect light rays produced by the lighting unit of the secondary optical assembly.

DESCRIPTION OF THE FIGURES

The invention will be clarified in a more detailed way with the use of its embodiment examples with references to attached drawings, where.

DESCRIPTION OF EXAMPLES OF EMBODIMENTS OF THE INVENTION

Figure 1:
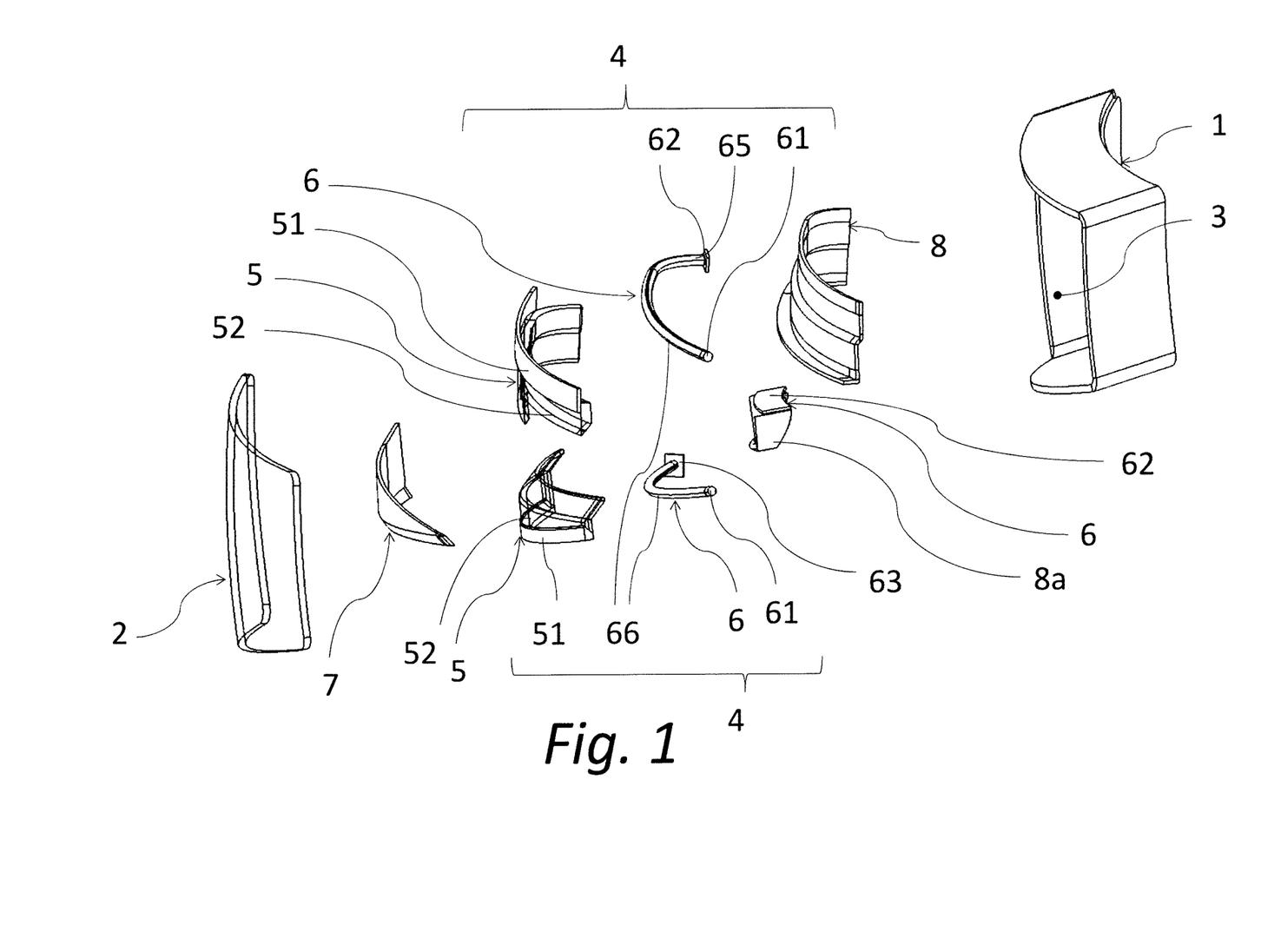
FIG. 1 shows an exploded axonometric view of the light device according to the invention.
Figure 2:
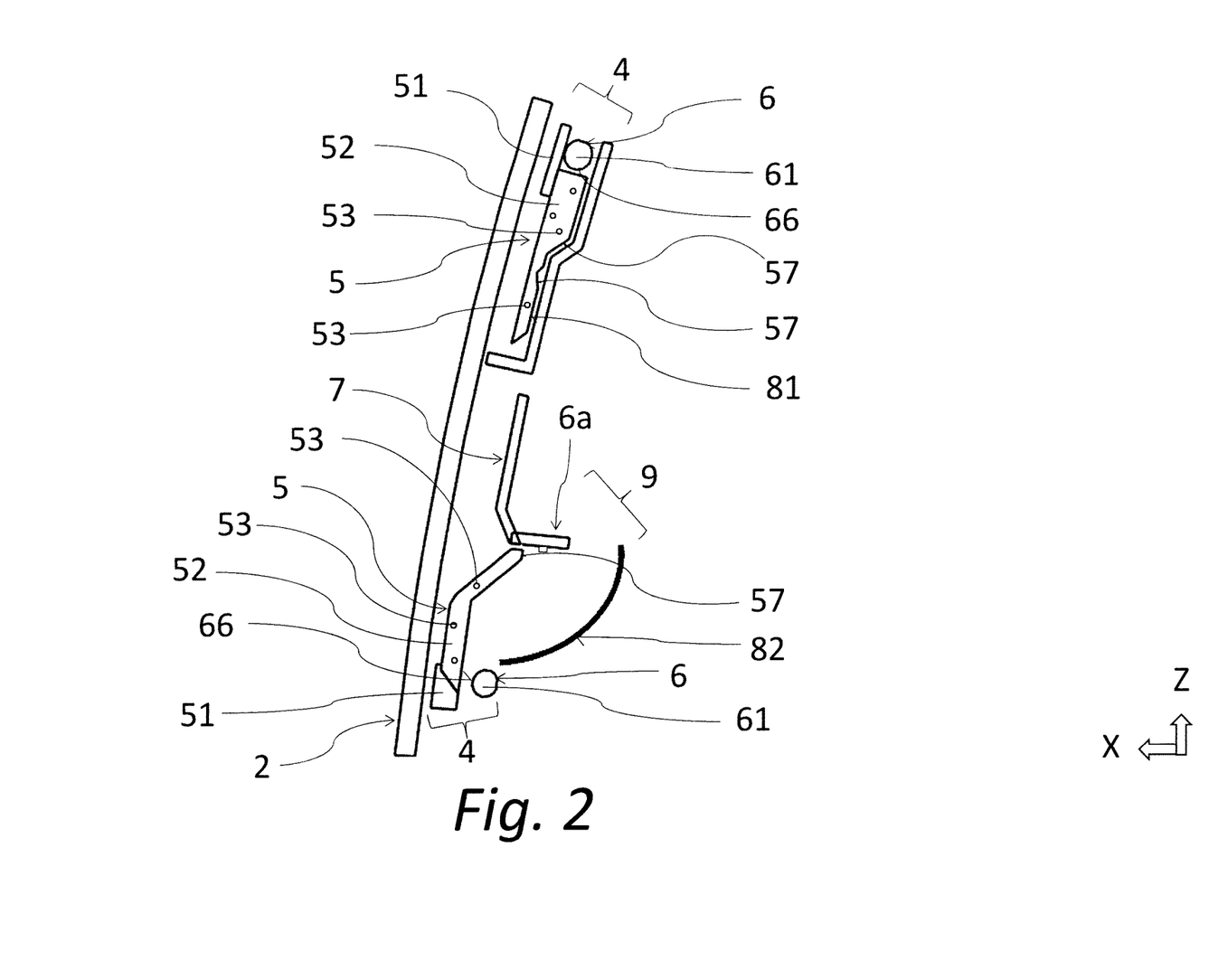
FIG. 2 shows a longitudinal cross-section through the light device according to the invention.

According to FIG. 1 and FIG. 2, the light device in accordance with the invention comprises a carrier housing 1 covered by a translucent cover 2 and an inner chamber 3 wherein two primary optical assemblies 4, a secondary optical assembly 9 and a front covering mask 7 are housed. Either of the primary optical assemblies 4 comprises its own lighting unit 6 to emit light into a spatially shaped planar light guide 5. The planar light guide 5 is fitted with a non-transparent covering segment 51 and can also comprises a transparent, light-emitting structure 52, the planar light guide 5 being produced as one piece with the use of the plastic injection molding process. The lighting unit 6 comprises a linear light guide 61 at the lateral input surface 65 of which a light source 62 is situated comprising at least one light-emitting diode mounted on a carrier 63. The non-transparent covering segment 51 of the planar light guide 5 covers the linear light guide 61 in the view of the inner chamber 3.

As viewed from the front side in the direction of the optical axis X, in the case of the primary optical assembly 4 situated in the top part of the light device, behind the planar light guide 5, an active optical element 8 is arranged, which is part of the primary optical assembly 4 and is implemented in the form of a surface 81 for reflection of light rays 100 (not shown) emitted by the planar light guide 5. And, in the case of the primary optical assembly 4, situated in the bottom part of the light device, behind the planar light guide 5, an active optical element 8a is arranged, implemented as an assembly of reflectors 82, which however belong to a separate secondary optical assembly 9.

Figure 1A:
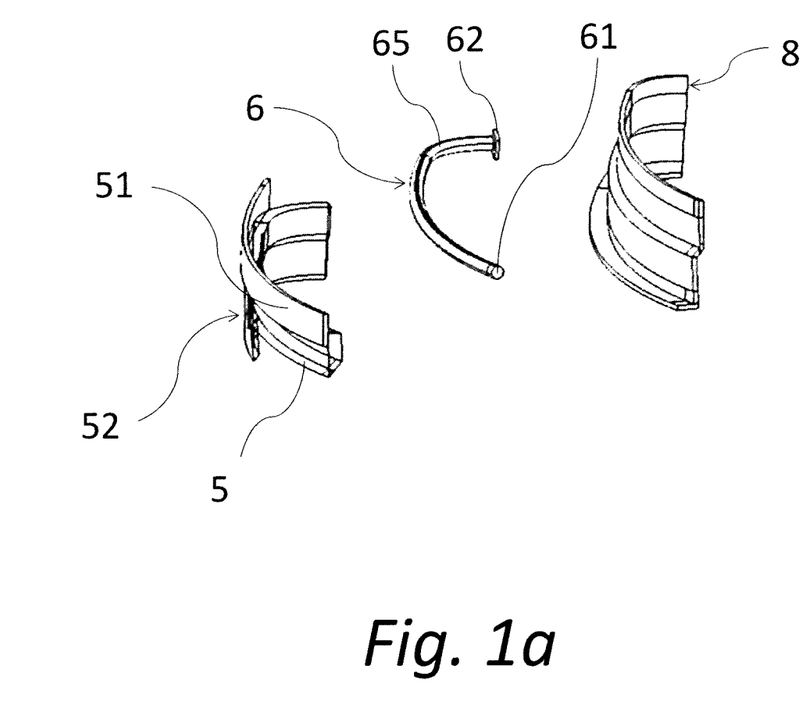
FIG. 1a shows an exploded axonometric view of one of the two primary optical assemblies (top assembly) of the light device of FIG. 1.
Figure 1B:
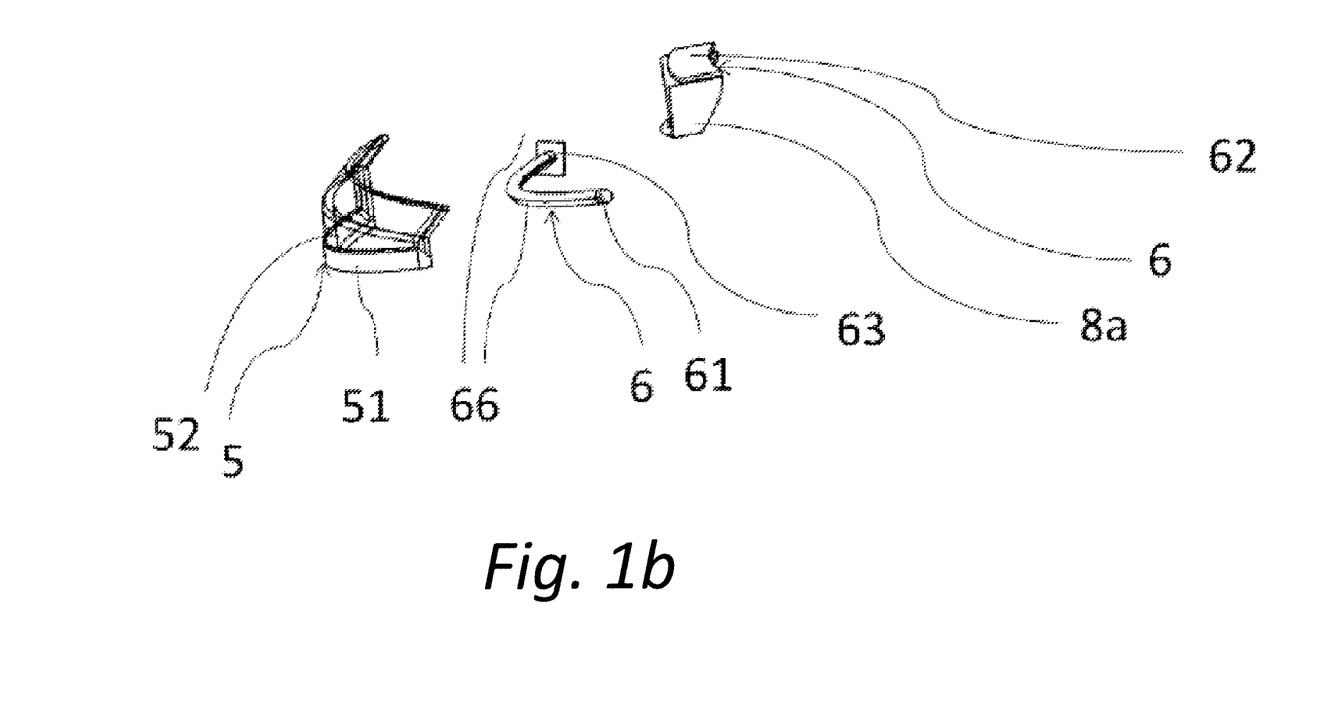
FIG. 1b shows an exploded axonometric view of the other one of the two primary optical assemblies (bottom assembly) of the device of FIG. 1.

FIGS. 1a and 1b are exploded axonometric views of individual primary optical assemblies 4 of the light device of FIGS. 1 and 2.

According to the present invention, the light guide surface includes, on its side facing away from the front output surface 55, at least one reflective surface 57 configured to direct light rays 100 (not shown) to the front output surface 55 and further through the output surface 55 out of the planar light guide 5 to create, on the front output surface 55, an output light region 59 with a light intensity which differs from light intensity shown by places adjacent to the region 59 on the front output surface 55. In his way, a desired light intensity contrast on the front output surface 55 is created, which enables for creating, e.g., patterns with a spatial effect or other pre-meditated light patterns. It is necessary to mention that the reflective surfaces 57 according to the invention are not an example or a part of toothlike decoupling elements frequently used in the prior art lightguides that are of clearly smaller measurements and are evenly deployed (usually in rows) on a lightguide surface opposed to its output surface, the function of which is to deflect light to the output surface such that it produces as homogenous as possible a light distribution.

Figure 3:
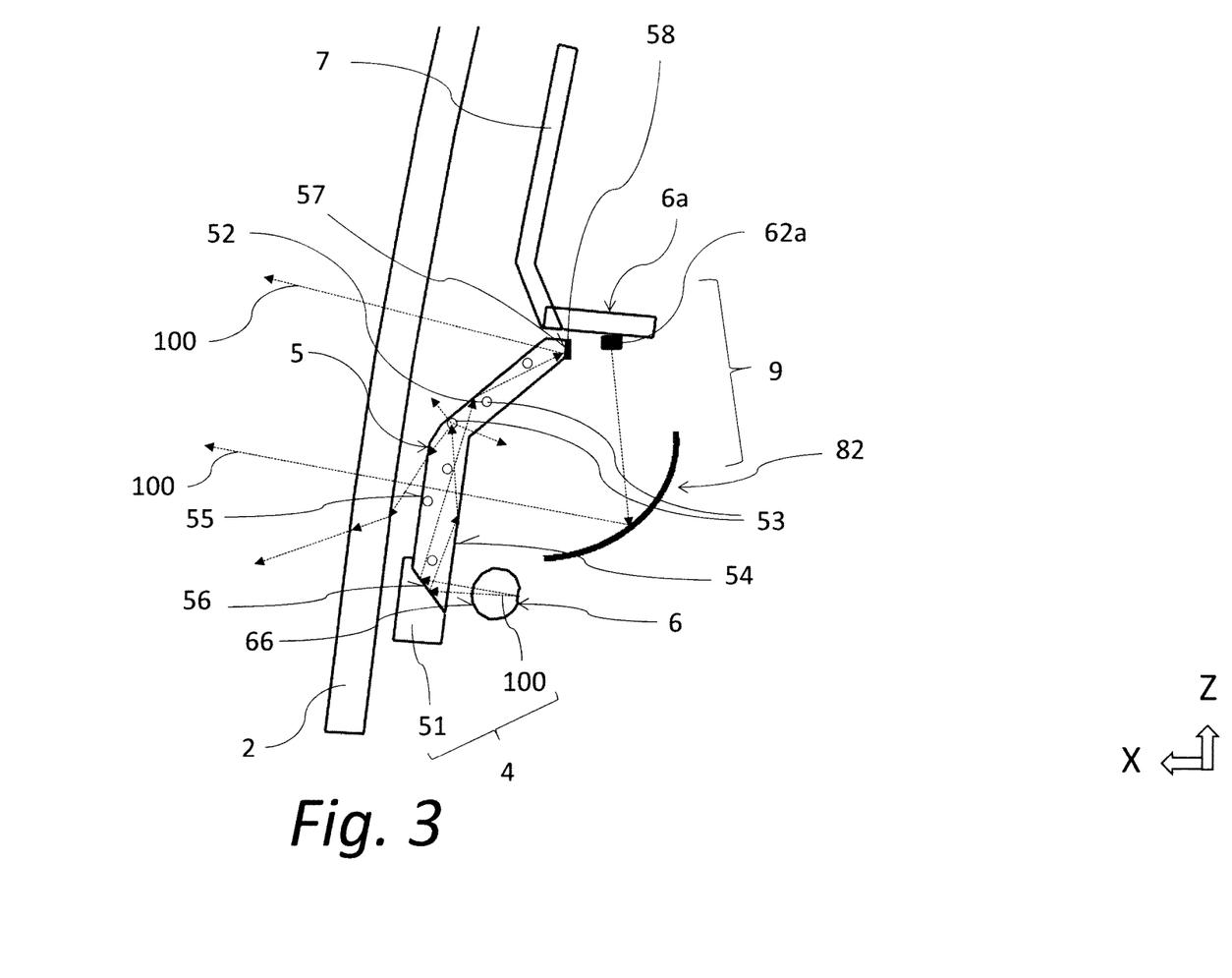
FIG. 3 shows a longitudinal cross-section through the bottom part of the light device of FIG. 2, which shows a detail of one of the primary optical assemblies (bottom assembly) positioned in the light device of FIG. 2, which is the first embodiment example of a primary optical assembly.

FIG. 3 shows a longitudinal cross-section through the bottom part of the light device of FIG. 2, which shows a detail of the primary optical assembly 4 situated in the bottom part of the light device, which represents the first embodiment example of a primary optical assembly 4. FIG. 3 further also shows the secondary optical assembly 9. In the body of the light-emitting and advantageously transparent structure 52 of the planar light guide 5, unbinding optical elements 53 are situated in the form of diffusion particles to diffuse and guide light rays 100 through the light guide surface and outside the planar light guide 5. Active diffusion particles are an additive already contained in the plastic before the injection molding process. The light guide surface of the planar light guide 5 comprises a rear surface 54 and a front output surface 55, which is generally oriented in the direction of the optical axis X and/ or Y. The light guide surface of the planar light guide 5 further comprises an input surface 56 to bind light rays 100 from the lighting unit 6 into the body of the planar light guide 5. At the other, terminal side, an unbinding reflective surface 57 is situated to direct light rays 100 in the desired direction and to produce designer light region 59 with different (in the particular case a higher one) light intensity (in the direction X and/or Y) than is produced by places adjacent to the region 59 on the front light surface 55. Behind the reflective surface 57, a metal-plated reflective surface 58 can be situated to achieve other designer elements. In the view of the inner space, the covering mask 7 covers the lighting unit 6a of the secondary optical assembly 9, which is adapted to emit light rays 100 produced by the light source 62a towards the reflectors 82.

Figure 4:
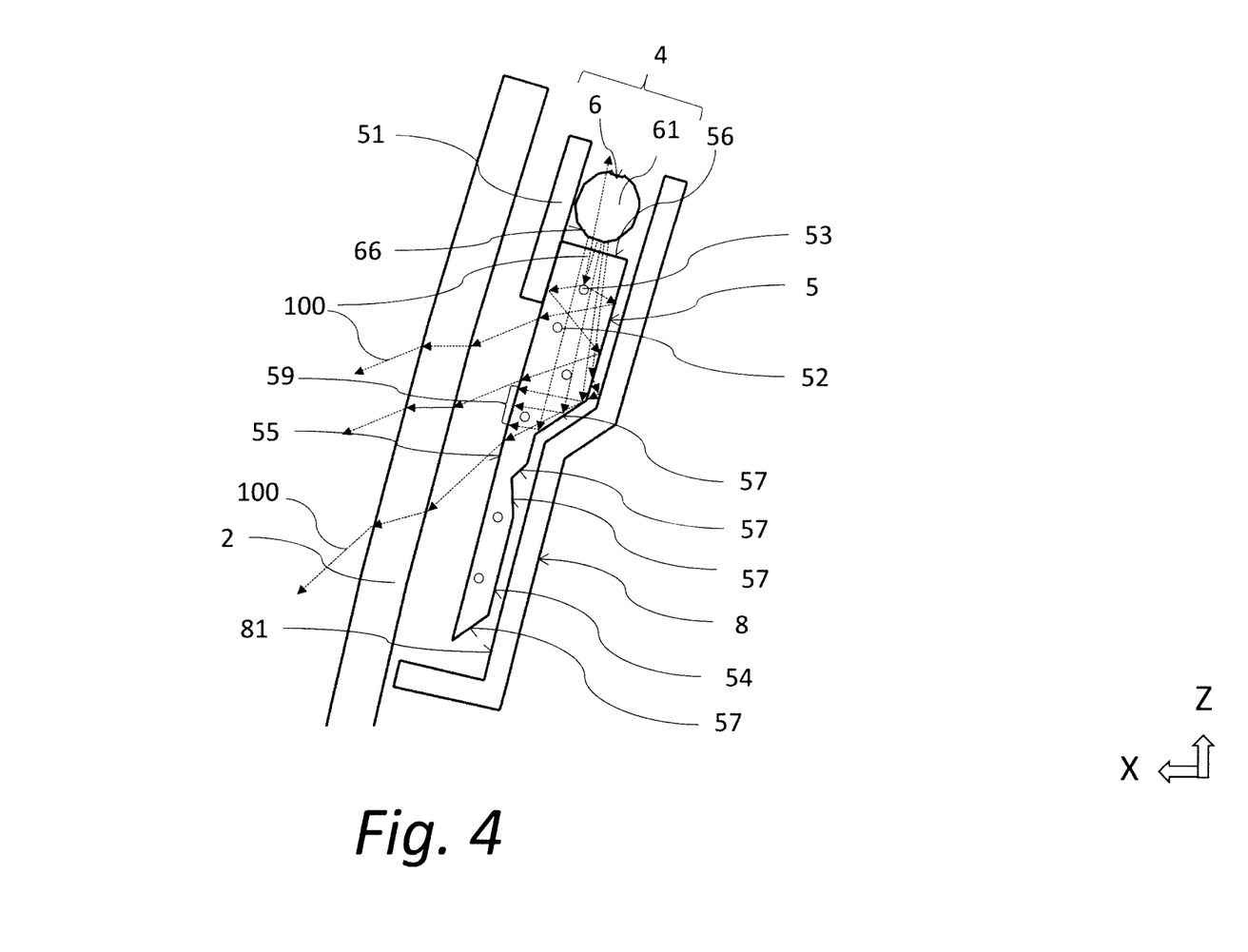
FIG. 4 shows a longitudinal cross-section through the top part of the light device of FIG. 2, which shows a detail of the other one of the primary optical assemblies (top assembly) positioned in the light device of FIG. 2, which is the second embodiment example of a primary optical assembly.

FIG. 4 shows the primary optical assembly 4 situated in the top part of the light device of FIG. 2, which represents the second embodiment example of a primary optical assembly 4, wherein the light guide surface of the planar light guide 5 comprises more unbinding reflective surfaces 57. In the view of the inner chamber 3, behind the planar light guide 5, an active optical element 8 is arranged that is implemented in the form of especially a diffusion optical element and/or reflective optical element to return rays 100 that have escaped from the planar light guide 5 through a part of its surface different from the front output surface 55, back to the body of the planar light guide 5. The entire optical element 8 is spatially shaped to achieve more designer elements. The covering segment 51 can be represented by the entire covering mask 7, which covers a part of the lighting unit 6 in the view of the inner chamber 3.

Figure 5:
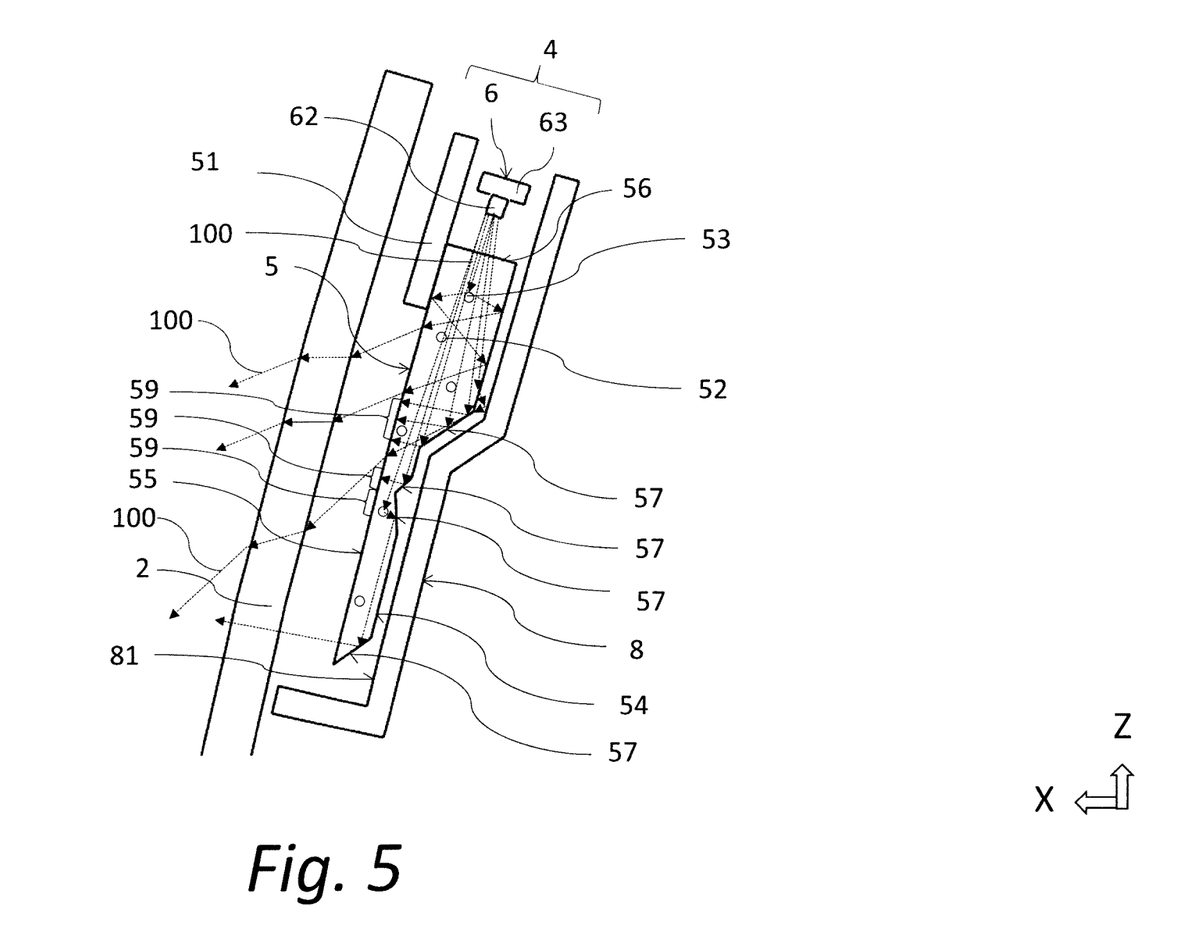
FIG. 5 shows a longitudinal cross-section through the third embodiment example of a primary optical assembly.

FIG. 5 shows a third embodiment example of a primary optical assembly 4, wherein the lighting unit 6 comprises an assembly of light sources 62 mounted on a carrier 63. The assembly of light sources 62 is adapted to emit light rays 100 towards the input surface 56 of the planar light guide 5.

Figure 6:
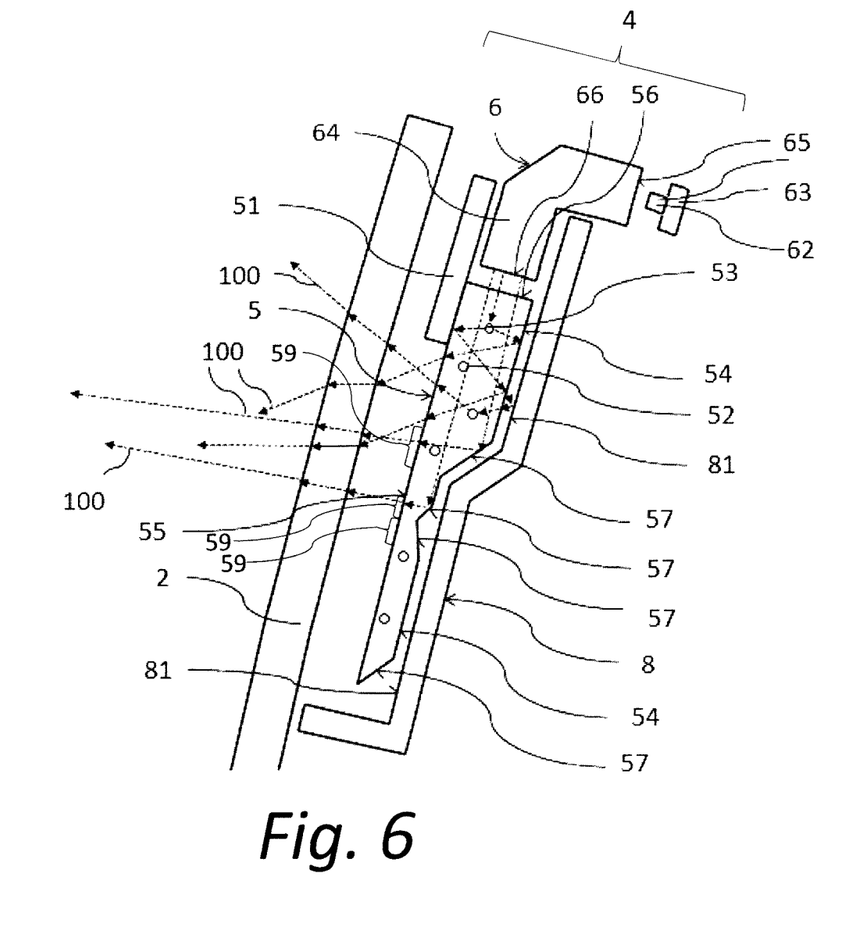
FIG. 6 shows a longitudinal cross-section through the fourth embodiment example of a primary optical assembly.

FIG. 6 shows a fourth embodiment example of a primary optical assembly 4, wherein the lighting unit 6 comprises a planar light guide 64 at the entry of which a light source 62 is situated comprising at least one light-emitting diode situated on a carrier 63. An assembly of light sources 62 is adapted to emit light rays towards the input surface 65 of the lighting planar light guide 64. Light rays are guided through the body of the planar light guide 64 towards the output surface 66 from which light rays 100 are emitted towards the input surface 56 of the planar light guide 5.

The output light function, especially of the amber and/or red and/or white color, is mainly ensured through the primary or secondary optical assembly 4, 9. The primary optical assembly 4 may provide a different light function from that provided by the secondary optical assembly 9. The primary optical assembly 4 comprises a lighting unit 6 which, through the output surface 66 and/or the light sources 62, emits light rays 100 that enter the body of the planar light guide 5 through the input surface 56. Each lighting unit 6 ensures or contributes to ensuring the output light characteristic of at least one light function. From the lighting unit 6, light rays are bound to the body of the transparent light-emitting structure 52 of the planar light guide 5. Light rays 100 advance in the body of the transparent light-emitting structure 52, a part of the light rays 100 being diffused by the unbinding optical elements 53 and exiting through the surfaces 54, 55 of the light guide surface. A part of the light rays 100 is reflected from the unbinding reflective surface 57 and exits through the front output surface 55 in the desired light output direction out of the light device, as a result of which the output surface 55 comprises light regions 59 generated by the reflection of light rays 100 from the reflective surfaces 57, which regions 59 differ with their light intensity from light intensity of places/areas that are adjacent to the regions 59. Thus, a certain beam or beams of the light rays 100 advantageously create a desired light pattern. With a suitable distribution of the light beams 100, the primary optical assembly 4 may produce a spatial light effect or another designer effect. In one embodiment, the rays 100 emitted from the rear surface 54 are reflected by the surface 81 of the optical element 8 and through the light guide surface, especially the rear surface 54, the light rays 100 are bound to the planar light guide 5.

The secondary optical assembly 9 can work with light rays 100 of the amber and/or red and/or white color, which enter the body of the planar light guide 5 through a part of the rear surface 54 and exit through the front output surface 55 in the direction "x" of light output from the light device.

List of Reference Marks
1—carrier housing
2—translucent cover
3—inner chamber
4—primary optical assembly
5—planar light guide
6, 6a—lighting unit
7—covering mask
8 8a—optical element
9—secondary optical assembly
51—covering segment
52—structure
53—unbinding optical elements
54—rear surface
55—front output surface
56—input surface
57—unbinding reflective surface
58—metal—plated reflective surface
59—region
61—linear light guide
62, 62a—light source
63—carrier
64—lighting planar light guide
65—input surface
66—output surface
81—surface
82—reflector
100—light ray

We claim:

1. A light device, especially a signal lamp for motor vehicles, comprising a carrier housing (1) covered by a translucent cover (2), and an inner chamber (3) in which at least one primary optical assembly (4) is housed comprising a planar light guide (5) to guide the light generated by a lighting unit (6), wherein a surface of the light guide comprises a front output surface (55) to emit light rays (100) out of the light device and an input surface (56) to bind light rays produced by the lighting unit (6) positioned outside the light guide surface into the planar light guide (5), wherein the light guide surface includes, on its side facing away from the front output surface (55), at least one reflective surface (57) configured to direct light rays (100) to the front output surface (55) and further through the output surface (55) out of the planar light guide (5) to create, on the front output surface (55), an output light region (59) with a light intensity which differs from light intensity shown by places adjacent to the region (59) on the front output surface (55), wherein the lighting unit (6) comprises a linear light guide (61) fitted with an input surface (65) and an output surface (66), at least one light source (62) being situated at she input surface (65) of the linear light guide (61) and the output surface (66) of the linear light guide (61) being situated opposite the input surface (56) of the planar light guide (5).

2. The light device, according to claim 1, wherein the planar light guide (5) comprises diffusion particles for diffusion of light rays, contained in at least one structure (52).

3. The light device according to claim 2, wherein at least one of the structures (52) is situated in the body of the planar light guide (5).

4. The light device according to claim wherein at least one of the structures (52) is situated on the planar light guide surface.

5. The light device according claim 2, wherein at least one of the structures (52) is transparent or at least pray transparent.

6. The light device according to claim 1, wherein the lighting unit (6) comprises an assembly of light sources (62) mounted on a carrier (63) opposite the input surface (56) of the planar light guide (5).

7. The light device according to claim 1, wherein the lighting unit (6) comprises a lighting planar light guide (64) fated with an input surface (65) and an output surface (66), at least one light source (62) being situated at the input surface (65) of the lighting planar light guide (64) and the output surface (66) of the lighting planar light guide (64) being situated opposite input surface (56) of the planar light guide (5).

8. The light device according to claim 1, wherein the planar light guide (5) is fitted with a non-transparent covering segment (51) to cover at least a part of the lighting unit (6) in the front view.

9. The light device according to claim 1, wherein the planar light guide (5) is produced as one integral piece.

10. The light device according to claim 1, wherein in the view of the inner chamber (3), behind the planar light guide (5), an active optical element (8) is arranged comprising a surface (81) facing the rear surface (54) of the planar light guide (5) with diffusion and/or reflective properties to return rays (100) that have escaped from the planar light guide (5) through a part of its surface different from the front output surface (55), back to the planar light guide (5) body.

11. The light device according to claim 1, wherein in the view of the inner chamber (3), behind the planar light guide (5), an active optical element (8a) is arranged comprising at least one reflector (82), which is part of a secondary optical assembly (9), to reflect light rays produced by a lighting unit (6a) of the secondary optical assembly (9).

12. A light device, especially a signal lamp for motor vehicles, comprising a carrier housing (1) covered by a translucent cover (2), and an inner chamber (3)in which at least one primary optical assembly (4) is housed comprising a planar light guide (5) to guide the light generated by a lighting unit (6),wherein a surface of the light guide comprises a front output surface (55) to emit light rays (100) out of the device and an input surface (56) to bind light rays produced by the lighting unit (6) positioned outside the light guide surface into the planar light guide (5), wherein the light guide surface includes, on its side facing away from the front output surface (55), at least one reflective surface (57) configured to direct light rays (100) to the front output surface (55) and farther through the output surface (55) out of the planar light guide (5) to create, on the front output surface (55), an output light region (59) with a light intensity which differs from light intensity shown by places adjacent to the region (59) on the front output surface (55), wherein in the view of the inner chamber (3), behind the planar light guide (5), an active optical element (8) is arranged comprising a surface (81) facing the roar surface (54) of the planar light guide (5) with diffusion and/or reflective properties to return rays (100) that have escaped from the planar light guide (5) through a part of its surface different from the front output surface (55), back to the planar light guide (5) body.

13. The light device according to claim 12, wherein the planar light guide (5) comprises diffusion particles for diffusion of light rays, contained in at least one structure (52).

14. The light device according to claim 12, wherein the lighting unit (6) comprises an assembly of light sources (62) mounted on a carrier (63) opposite the input surface (56) of the planar light guide (5).

15. The light device according to claim 12, wherein the lighting unit (6) comprises a lighting planar light guide (64) fitted with an input surface (65) and an output surface (66), at least one light source (62) being situated at the input surface (65) of the lighting planar light guide (64) and the output surface (66) of the lighting planar light guide (64) being situated opposite the input surface (56) of the planar light guide(5).

16. The tight device according to claim 12, wherein the planar light guide (5) is fitted with a non-transparent covering segment (51) to cover at least a part of the lighting unit (6) in the front view.

17. The light device according to claim 12, wherein in the view of die inner chamber (3), behind the planar light guide (5), an active optical element (8a) is arranged comprising at least one reflector (82), which is part of a secondary optical assembly (9), to reflect rays produced by a lighting unit (6a) of the secondary optical assembly (9).

18. A light device, especially a signal lamp for motor vehicles, comprising a carrier housing (1) covered by a translucent cover (2),and an inner chamber (3) in which at least one primary optical assembly (4) is housed comprising a planar light guide (5)to guide the light generated by a lighting unit (6),wherein a surface of the light guide comprises a front output surface (55) to emit light rays (100) out of the light device and an input surface (56) to bind light rays produced by the lighting unit (6) positioned outside the light guide surface into the planar light guide (5), wherein the light guide surface includes, on its side facing away from the front output surface (55), at least one reflective surface (57) configured to direct light rays (100) to the front output surface (55) and further through the output surface (55) out of the planar light guide (5) to create, on the front output surface (55),an output light region (59) with a light intensity which differs from light intensity shown by places adjacent to the region (59) on the front output surface (55), wherein the lighting unit (6) comprises a lighting planar light guide (64) fitted with an input surface (65) and an output surface (66), at least one light source (62) being situated at the input surface (65) of the lighting planar light guide (64) and the output surface (66) of the lighting planar light guide (64) being situated opposite the input surface (56) of the planar light guide (5) to emit light rays (100) that enter the planar light guide(5) through the input surface (56).

19. The light device according to claim 18, wherein the planar light guide (5) comprises diffusion particles for diffusion of light rays, contained in at least one structure (52).

20. The light device according to claim 18, wherein the lighting unit (6) comprises an assembly of light sources (62) mounted on a carrier (63) opposite the input surface (56) of the planar light guide (5).

\* \* \* \* \*